3,098,880
GLYCOL SEPARATION
Bernard A. Saffer and Julian Feldman, Cincinnati, Ohio, assignors to National Distillers and Chemical Corporation, New York, N.Y., a corporation of Virginia
No Drawing. Filed Jan. 5, 1960, Ser. No. 491
5 Claims. (Cl. 260—637)

This invention relates broadly to an improved method for the separation of crude, isomeric mixtures of glycols into relatively pure straight chain and branched chain components and, more particularly, to a novel and highly effective means for recovering relatively pure long chain (e.g., $C_{10}$, $C_{12}$) straight chain glycols from isomeric mixtures containing same.

It is an object of this invention to provide a novel, economical, and practical process for the production of pure straight chain glycols and branched chain glycols. It is another object of this invention to separate isomeric mixtures of crude glycols into their straight chain and branched chain components in substantially high yields and in substantially pure form. Additional objectives of the invention will become apparent from the following description.

It is known that an aliphatic conjugated diolefin can be treated with an alkalimetal (e.g., sodium, potassium, etc.) in finely dispersed form, in a selected liquid medium and, if desired, in the presence of a relatively small amount of a polycyclic aromatic hydrocarbon and/or in the presence of a selected solid, friable attrition agent at a temperature preferably below about 0° C. to produce a mixture comprised predominantly of dimetallo derivatives of the dimerized olefins. This dimetallo product is then treated under selective reaction conditions with oxygen, an oxygen-containing chemical compound, or some other appropriate reactant to yield alkali metal salts of the corresponding unsaturated glycols. These salts are then treated with water or an alcohol such as methanol or ethanol to destroy any unreacted dialkali metal and to liberate the unsaturated glycols from their alkali metal derivatives which are initially formed. The glycols are isolated from this reaction mixture by extraction, distillation, or other suitable means. The glycol products, the preparation of which is described in detail in, for example U.S. Patents 2,850,538, 2,850,539, and 2,850,540, may subsequently be hydrogenated, thereby giving mixtures of crude, saturated glycols, i.e., alkanediols, comprising both straight chain and branched chain components.

Important commercial applications have been developed for straight chain glycols and for branched chain glycols in many fields; for example, the branched chain glycols are useful in the manufacture of solid propellants for rockets; the straight chain glycols are used in synthetic waxes and polishes; either branched or straight chain glycols or a combination of both are used in the synthesis of plasticizers, synthetic lubricants, polyester resins and rubbers, polyurethanes, alkyds, and so forth. Thus, for many applications, it is desirable to obtain, from the crude isomeric mixtures, a relatively pure straight chain fraction and a relatively pure branched chain fraction.

The present invention relatees to a novel and practical process which has been found to separate isomeric mixtures of glycols, i.e., alkanediols, as afore described into a straight chain fraction and a branched chain fraction. The process is based on the unexpected discovery that the straight chain component of an isomeric mixture of glycols can be selectively separated from the branched chain component by selective solvent extraction. More specifically, it has been found that straight chain glycols are relatively insoluble in certain liquid aliphatic ketones, whereas branched chain glycols and associated impurities are relatively soluble in these same liquid aliphatic ketones.

Depending upon the starting reactants employed, in the aforesaid dimerization process, a wide variety of glycol mixtures may be obtained. For example, where the initial reactants are butadiene and sodium and the glycols are prepared by using ethylene oxide, there results a mixture of $C_{12}$ unsaturated glycols; after hydrogenation, the saturated glycols, i.e., alkanediols, obtained include the straight chain glycol, i.e., alkanediol, 1,12-dodecanediol, and the branched chain glycols, i.e., alkanediols, 3,6-diethyl-1,8-octanediol and 3-ethyl-1,10-decanediol. With formaldehyde, there results a mixture of $C_{10}$ unsaturated glycols; after hydrogenation, the saturated glycols, i.e., alkanediols, obtained include the straight chain glycol, 1,10-decanediol, and the branched chain glycols, 2,5-diethyl-1,6-hexanediol and 2-ethyl-1,8-octanediol. When other diolefins are used for the initial reaction, such as isoprene, dimethylbutadiene, pentadiene, and the like, the final products will vary accordingly.

Such crude glycol mixtures are generally composed primarily of straight and branched chain glycols and may contain also relatively small amounts of impurities such as residual hydrogenation catalyst; monohydric alcohols; polymeric glycols and alcohols; unsaturated glycols, hydrocarbons, and other materials which may have passed through the hydrogenation step without being hydrogenated; and the lilke. Solid impurities may be removed by filtering or centrifuging the crude mixture of glycols. Distillation of the crude mixture of glycols before hydrogenation, after hydrogenation, or if desired, both before and after hydrogenation serves to remove most of the lower boiling hydrocarbons, monohydric alcohols, and polymeric impurities.

In accordance with the present invention, the total isomeric mixture of crude glycols, as, for example, a mixture obtained by the aforesaid processes, is subjected to a treatment with a suitable liquid ketone under controlled conditions to recover selectively the substantially pure straight chain glycol; the remaining crude branched chain glycol mixture is then purified by any suitable means, such as distillation. More specifically, it has been discovered that certain liquid ketones are highly selective in their ability to preferentially dissolve branched chain glycols.

The present invention comprises treating an isomeric mixture of crude glycols with an aliphatic, saturated dialkyl ketone having from about 3 to about 8 C atoms, such as, for example, acetone, methyl isobutyl ketone, methyl ethyl ketone, ethyl amyl ketone, or the like, or mixtures thereof, at a temperature of about 0° to 40° C., and preferably at about 10° to 25° C. In this temperature range the branched chain glycols are substantially in solution in the ketone and the crude straight chain component crystallizes out. The straight chain component thus obtained is then isolated by any conventional means, such as by filtering or by centrifuging, and purified by recrystallization from a ketone or by washing with a ketone at about 10° to 25° C. to remove any contaminating liquid branched chain glycols. The solvent in the filtrates, such as may be obtained from the initial step of separation and from the recrystallization step, may be recovered by any appropriate means, such as by distilling off the solvent. The remaining material is then purified by any suitable means, such as distillation and/or extraction, thus obtaining a mixture of subtanstially pure branched chain glycols. Thus, by practice of the invention embodied herein, there results a selective separation of substantially pure straight chain glycol, e.g., 1,12-dodecanediol or 1,10-decanediol, and branched chain glycols, e.g., 3-ethyl-1,10-decanediol and 3,6-diethyl-1,8-octanediol or 3-ethyl-1,8-octanediol and 2,5-diethyl-1,6-hexanediol, from mixtures comprising same and contaminating materials difficulty removable therefrom by conventional separation means.

Although the amount of solvent employed is not critical, it is usually employed in an amount equivalent to about 1 to 20 moles per mole of total glycols, and preferably in an amount of about 2 to 10 moles per mole of total glycols.

Although the process of the present invention will be illustrated essentially in relation to mixtures of isomeric aliphatic, saturated $C_{12}$ glycols obtained by the reaction of disodiooctadiene (the reaction product of butadiene with sodium) with ethylene oxide, it is not intended that the process be limited to such an isomeric mixture. The process of separating such mixtures into their straight chain and branched chain components is equally applicable to any mixture of isomeric aliphatic, saturated $C_{10}$ or $C_{12}$ glycols, i.e., alkanediols.

The more detailed practice of the invention is illustrated by the following examples wherein parts are given by weight unless otherwise specified. These examples are illustrative only and are not intended to limit the invention in any way except as indicated by the appended claims.

EXAMPLE 1

Disodiooctadiene was prepared from 3.0 moles of butadiene and 3.0 grams atomic weight of sodium in a dimethyl ether reaction medium. The reaction was carried out by initially preparing a finely divided sodium dispersion in isooctane and contacting the dispersion in the presence of the dimethyl ether reaction medium with butadiene in the presence of about 1 to 2 percent of terphenyl at about −23° C. About 1.2 moles of disodiooctadiene resulted from this reaction. When this initial reaction was complete, 3.0 moles of gaseous ethylene oxide were admitted to the mixture over a two-hour period while maintaining a reaction temperature of about −30° C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. A mixture of 297 parts of the unsaturated $C_{12}$ glycols and 350 parts of methanol was hydrogenated in a hydrogenation bomb at 300 p.s.i.g. over a nickel catalyst. The resulting saturated $C_{12}$ glycols, comprising approximately 30 percent of the straight chain glycol 1,12-dodecanediol, and the branched chain glycols, 3,6-diethyl-1,8-octanediol (about 16 percent) and 3-ethyl-1,10-decanediol (about 54 percent), were then washed from the bomb with 200 parts of methanol; the mixture was filtered to remove the catalyst. After removal of the methanol, 239 parts of saturated glycols were obtained. This quantity of mixed crude $C_{12}$ glycols was then treated with an equal weight of methyl isobutyl ketone. The formed slurry was agitated, cooled to about 15° C., and held at this temperature for several hours. The straight chain glycol component of the mixture crystallized and was separated by filtration; the filtrate was held at about 15° C. for an hour and was again filtered. The filter cake was purified by heating it to reflux (about 115° C.) in methyl isobutyl ketone; filtering the solution while hot (about 75° C.) to remove solid contaminants; cooling the solution to about 15° C.; and filtering. There was obtained about 60 parts (26 percent based on total glycols) of pure 1,12-dodecanediol (M.P. 80–81° C., percent OH=16.84). The filtrate consisting of crude branched chain glycols in methyl isobutyl ketone was then evaporated at reduced pressure to remove the methyl isobutyl ketone. The monohydric alcohols and other low boiling impurities, the residue, and tars were removed by distillation and extraction, yielding 154 parts (64 percent) of substantially pure, liquid, mixed $C_{12}$ branched chain glycols (percent OH=16.3).

The procedure of Example 1 was repeated, except that different solvents, different ratios of glycol to solvent, and different temperatures were employed to effect the separation of various crude, isomeric mixtures of $C_{12}$ glycols into their straight chain and branched chain components. The results are tabulated below.

Table

| Example | Solvent | Ratio, Glycol/Solvent | Temp., °C. | 1,12-Dodecanediol Yield, percent | 1,12-Dodecanediol M.P., °C. |
|---|---|---|---|---|---|
| 2 | Acetone | 1.00 | 10 | 26.0 | 80.1–80.7 |
| 3 | do | 0.50 | 10 | 25.4 | 80.6–81.6 |
| 4 | do | 0.25 | 10 | 26.0 | 80.1–80.5 |
| 5 | Methyl isobutyl ketone | 0.50 | 10 | 26.8 | 80.2–81.1 |
| 6 | Methyl ethyl ketone | 1.00 | 10 | 24.3 | 79.6–80.5 |
| 7 | do | 0.50 | 10 | 24.3 | 79.5–80.5 |

EXAMPLE 8

An isomeric mixture of saturated $C_{10}$ glycols was prepared by blending 12.7 parts of 1,10-decanediol with 32.8 parts of branched chain glycols obtained by the Bouveault-Blanc reduction of esters of isosebacic acid. A sample of this blend was recrystallized from twice its weight of methyl isobutyl ketone at 10° C. for two hours. There was obtained about 57 percent, based on the amount of the straight chain component of the $C_{10}$ glycol blend, of 1,10-decanediol which melted at 71.2–72.4° C. (literature value, 71.5° C.).

While above are disclosed but a limited number of embodiments of the invention presented herein, it is possible to produce still other embodiments without departing from the inventive concept. It is desired therefore that only such limitations be imposed upon the appended claims as are stated therein.

What is claimed is:

1. A process for the separation of 1,12-dodecanediol from a mixture of crude isomeric aliphatic, saturated $C_{12}$ alkanediols which comprises admixing said crude isomeric mixture at about 0° to 40° C. with an aliphatic, saturated dialkyl ketone having from about 3 to about 8 carbon atoms to selectively precipitate the 1,12-dodecanediol.

2. The process of claim 1 wherein the starting mixture is admixed with the ketone at a temperature between about 10° and 25° C.

3. A process for the separation of 1,10-decanediol from a mixture of crude isomeric aliphatic, saturated $C_{10}$ alkanediols which comprises admixing said crude isomeric mixture at about 0° to 40° C. with an aliphatic, saturated dialkyl ketone having from about 3 to about 8 carbon atoms to selectively precipitate the 1,10-decanediol.

4. The process of claim 3 wherein the starting mixture is admixed with the ketone at a temperature between about 10° to 25° C.

5. A method for the separation and recovery of substantially pure 1,12-dodecanediol from a mixture of crude isomeric aliphatic, saturated $C_{12}$ glycols comprising 1,12-dodecanediol, 3-ethyl-1,10-decanediol, and 3,6-diethyl-1,8-octanediol which comprises admixing said crude isomeric mixture with methyl isobutyl ketone at about 10° to 25° C., removing the resulting precipitate by filtration, refluxing said precipitate with methyl isobutyl ketone to yield substantially pure 1,12-dodecanediol, and distilling the filtrate to yield a mixture of substantially pure 3-ethyl-1,10-decanediol and 3,6-diethyl-1,8-octanediol.

References Cited in the file of this patent

UNITED STATES PATENTS

| | | |
|---|---|---|
| 2,325,783 | Lorand | Aug. 3, 1943 |
| 2,850,538 | Nobis et al. | Sept. 2, 1958 |
| 2,850,539 | Schott et al. | Sept. 2, 1958 |
| 2,850,540 | Frank et al. | Sept. 2, 1958 |